(12) United States Patent
Presz, Jr. et al.

(10) Patent No.: US 8,021,100 B2
(45) Date of Patent: Sep. 20, 2011

(54) WIND TURBINE WITH MIXERS AND EJECTORS

(75) Inventors: Walter M. Presz, Jr., Wilbraham, MA (US); Michael J. Werle, West Hartford, CT (US)

(73) Assignee: Flodesign Wind Turbine Corporation, Wilbraham, MA (US)

( * ) Notice: Subject to any disclaimer, the term of this patent is extended or adjusted under 35 U.S.C. 154(b) by 551 days.

(21) Appl. No.: 12/054,050

(22) Filed: Mar. 24, 2008

(65) Prior Publication Data

US 2008/0232957 A1 Sep. 25, 2008
US 2009/0087308 A2 Apr. 2, 2009

Related U.S. Application Data

(60) Provisional application No. 60/919,588, filed on Mar. 23, 2007.

(51) Int. Cl.
*F03D 1/04* (2006.01)
(52) U.S. Cl. .................. 415/4.3; 415/211.2; 415/220
(58) Field of Classification Search .................. 415/2.1, 415/4.1, 4.3, 4.5, 227
See application file for complete search history.

(56) References Cited

U.S. PATENT DOCUMENTS

| 1,312,021 | A | * | 8/1919 | Dickinson et al. ............. 415/4.1 |
| 3,986,787 | A | * | 10/1976 | Mouton et al. .................... 415/7 |
| 4,021,135 | A | | 5/1977 | Pedersen et al. |
| 4,038,848 | A | | 8/1977 | Ichiryu et al. |
| 4,075,500 | A | * | 2/1978 | Oman et al. .................... 415/4.3 |
| 4,077,206 | A | | 3/1978 | Ayyagari |
| 4,140,433 | A | | 2/1979 | Eckel |
| 4,166,596 | A | | 9/1979 | Mouton, Jr. et al. |
| 4,204,799 | A | * | 5/1980 | de Geus .......................... 415/4.5 |
| 4,320,304 | A | | 3/1982 | Karlsson et al. |
| 4,324,985 | A | | 4/1982 | Oman |

(Continued)

FOREIGN PATENT DOCUMENTS

RU 2147693 C1 * 4/2000

(Continued)

OTHER PUBLICATIONS

English Translation of RU 2,147,693 C1. FLS, Inc. Aug. 2010.*

(Continued)

*Primary Examiner* — Richard Edgar
(74) *Attorney, Agent, or Firm* — Fay Sharpe LLP; Richard M. Klein

(57) ABSTRACT

A Mixer/Ejector Wind Turbine ("MEWT") system is disclosed which routinely exceeds the efficiencies of prior wind turbines. In the preferred embodiment, Applicants' MEWT incorporates advanced flow mixing technology, single and multi-stage ejector technology, aircraft and propulsion aerodynamics and noise abatement technologies in a unique manner to fluid-dynamically improve the operational effectiveness and efficiency of wind turbines, so that its operating efficiency routinely exceeds the Betz limit. Applicants' preferred MEWT embodiment comprises: an aerodynamically contoured turbine shroud with an inlet; a ring of stator vanes; a ring of rotating blades (i.e., an impeller) in line with the stator vanes; and a mixer/ejector pump to increase the flow volume through the turbine while rapidly mixing the low energy turbine exit flow with high energy bypass wind flow. The MEWT can produce three or more time the power of its un-shrouded counterparts for the same frontal area, and can increase the productivity of wind farms by a factor of two or more. The same MEWT is safer and quieter providing improved wind turbine options for populated areas.

20 Claims, 15 Drawing Sheets

U.S. PATENT DOCUMENTS

| | | | |
|---|---|---|---|
| 4,482,290 A | | 11/1984 | Foreman et al. |
| 4,516,907 A | | 5/1985 | Edwards |
| 4,720,640 A | | 1/1988 | Anderson et al. |
| 4,781,522 A | | 11/1988 | Wolfram |
| 4,786,016 A | | 11/1988 | Presz, Jr. et al. |
| 5,083,899 A | | 1/1992 | Koch |
| 5,110,560 A | | 5/1992 | Presz, Jr. et al. |
| 5,213,138 A | | 5/1993 | Presz, Jr. |
| 5,230,369 A | | 7/1993 | Presz, Jr. |
| 5,230,656 A | | 7/1993 | Paterson et al. |
| 5,327,940 A | | 7/1994 | Presz, Jr. |
| 5,440,875 A | * | 8/1995 | Torkelson et al. ........... 60/226.1 |
| 5,447,412 A | | 9/1995 | Lamont |
| 5,464,320 A | | 11/1995 | Finney |
| 5,506,453 A | | 4/1996 | McCombs |
| 5,554,472 A | | 9/1996 | Aizawa |
| 5,761,900 A | | 6/1998 | Presz, Jr. |
| 5,836,738 A | | 11/1998 | Finney |
| 5,884,472 A | | 3/1999 | Presz, Jr. et al. |
| 5,947,678 A | | 9/1999 | Bergstein |
| 5,992,140 A | | 11/1999 | Hammond et al. |
| 6,016,651 A | | 1/2000 | Hammond et al. |
| 6,082,635 A | | 7/2000 | Seiner et al. |
| 6,127,739 A | | 10/2000 | Appa |
| 6,233,920 B1 | | 5/2001 | Presz, Jr. et al. |
| 6,276,127 B1 | | 8/2001 | Alberti |
| 6,278,197 B1 | | 8/2001 | Appa |
| 6,311,928 B1 | | 11/2001 | Presz, Jr. et al. |
| 6,382,904 B1 | | 5/2002 | Orlov et al. |
| 6,655,907 B2 | | 12/2003 | Brock et al. |
| 6,659,719 B2 | * | 12/2003 | Angelis ...................... 415/211.2 |
| 6,854,260 B2 | | 2/2005 | Anderson |
| 6,877,960 B1 | | 4/2005 | Presz, Jr. et al. |
| 6,887,031 B1 | | 5/2005 | Tocher |
| 7,017,331 B2 | | 3/2006 | Anderson |
| 7,111,448 B2 | | 9/2006 | Anderson |
| 7,144,216 B2 | | 12/2006 | Hessel |
| 7,218,011 B2 | * | 5/2007 | Hiel et al. ...................... 415/2.1 |
| 7,220,096 B2 | | 5/2007 | Tocher |
| 7,251,927 B2 | | 8/2007 | Anderson |
| 7,270,043 B2 | | 9/2007 | Presz, Jr. et al. |
| 7,600,963 B2 | * | 10/2009 | Miller ........................... 415/4.3 |
| 2004/0005226 A1 | | 1/2004 | Smith, III |
| 2004/0156710 A1 | * | 8/2004 | Gaskell ...................... 415/169.1 |
| 2006/0151633 A1 | | 7/2006 | Presz, Jr. et al. |

FOREIGN PATENT DOCUMENTS

| | | |
|---|---|---|
| WO | WO03081031 A1 | 2/2003 |
| WO | WO 2004099607 A2 * | 11/2004 |

OTHER PUBLICATIONS

Igra, O., "Shrouds for Aerogenerators", AIAA Journal, Oct. 1976, pp. 1481-1483, vol. 14, No. 10.

Werle, M.J., Ph.D., et al., "Ducted Wind/Water Turbines and Propellers Revisited". Article designed and produced by FloDesign, Inc., Wilbraham, MA.

Hansen, M.O.L., et al., "Effect of Placing a Diffuser around a Wind Turbine", Wind Energy, 2000, pp. 3:207-213.

Igra, Ozer, "Research and Development for Shrouded Wind Turbines", Energy Cons. & Management, 1981, pp. 13-48, vol. 21.

Future Energy Solutions, Inc.'s Wind Tamer™ Turbines video demonstration (refer to the enclosed CD) found on Future Energy Solutions, Inc.'s website (http://www.windtamerturbines.com/about-wind-tamer-turbines.asp), Oct. 8, 2008, Livonia, NY.

JP 61-043276 A, English Translation, Schreiber Translations, Inc., Nov. 2010, pp. 1-21.

* cited by examiner

WIND TURBINE WITH MIXERS AND EJECTORS

RELATED APPLICATION

This application claims priority from Applicants' U.S. Provisional Patent Application Ser. No. 60/919,588, filed Mar. 23, 2007 (hereinafter "Applicants' Provisional Application"). Applicants hereby incorporate the disclosure of Applicants' Provisional Application by reference.

FIELD OF INVENTION

The present invention deals generally with axial flow turbines. More particularly, it deals with axial flow wind turbines.

BACKGROUND OF INVENTION

Wind turbines usually contain a propeller-like device, termed the "rotor", which is faced into a moving air stream. As the air hits the rotor, the air produces a force on the rotor in such a manner as to cause the rotor to rotate about its center. The rotor is connected to either an electricity generator or mechanical device through linkages such as gears, belts, chains or other means. Such turbines are used for generating electricity and powering batteries. They are also used to drive rotating pumps and/or moving machine parts. It is very common to find wind turbines in large electricity generating "wind farms" containing multiple such turbines in a geometric pattern designed to allow maximum power extraction with minimal impact of each such turbine on one another and/or the surrounding environment.

The ability of a rotor to convert fluid power to rotating power, when placed in a stream of very large width compared to its diameter, is limited by the well documented theoretical value of 59.3% of the oncoming stream's power, known as the "Betz" limit as documented by A. Betz in 1926. This productivity limit applies especially to the traditional multi-bladed axial wind/water turbine presented in FIG. 1, labeled Prior Art.

Attempts have been made to try to increase wind turbine performance potential beyond the "Betz" limit. Shrouds or ducts surrounding the rotor have been used. See, e.g., U.S. Pat. No. 7,218,011 to Hiel et al. (see FIG. 27); U.S. Pat. No. 4,204,799 to de Geus (see FIG. 28); U.S. Pat. No. 4,075,500 to Oman et al. (see FIG. 29); and U.S. Pat. No. 6,887,031 to Tocher. Properly designed shrouds cause the oncoming flow to speed up as it is concentrated into the center of the duct. In general, for a properly designed rotor, this increased flow speed causes more force on the rotor and subsequently higher levels of power extraction. Often though, the rotor blades break apart due to the shear and tensile forces involved with higher winds.

Values two times the Betz limit allegedly have been recorded but not sustained. See Igar, O., Shrouds for Aerogenerators, AIAA Journal, October 1976, pp. 1481-83; Igar & Ozer, Research and Development for Shrouded Wind Turbines, Energy Cons. & Management, Vol. 21, pp. 13-48, 1981; and see the AIAA Technical Note, entitled "Ducted Wind/Water Turbines and Propellers Revisited", authored by Applicants ("Applicants' AIAA Technical Note"), and accepted for publication. Copies can be found in Applicants' Information Disclosure Statement. Such claims however have not been sustained in practice and existing test results have not confirmed the feasibility of such gains in real wind turbine application.

To achieve such increased power and efficiency, it is necessary to closely coordinate the aerodynamic designs of the shroud and rotor with the sometimes highly variable incoming fluid stream velocity levels. Such aerodynamic design considerations also play a significant role on the subsequent impact of flow turbines on their surroundings, and the productivity level of wind farm designs.

Ejectors are well known and documented fluid jet pumps that draw flow into a system and thereby increase the flow rate through that system. Mixer/ejectors are short compact versions of such jet pumps that are relatively insensitive to incoming flow conditions and have been used extensively in high speed jet propulsion applications involving flow velocities near or above the speed of sound. See, for example, U.S. Pat. No. 5,761,900 by Dr. Walter M. Presz, Jr, which also uses a mixer downstream to increase thrust while reducing noise from the discharge. Dr. Presz is a co-inventor in the present application.

Gas turbine technology has yet to be applied successfully to axial flow wind turbines. There are multiple reasons for this shortcoming. Existing wind turbines use non-shrouded turbine blades to extract the wind energy. As a result, a significant amount of the flow approaching the wind turbine blades flows around and not through the blades. Also, the air velocity decreases significantly as it approaches existing wind turbines. Both of these effects result in low flow through, turbine velocities. These low velocities minimize the potential benefits of gas turbine technology such as stator/rotor concepts. Previous shrouded wind turbine approaches have keyed on exit diffusers to increase turbine blade velocities. Diffusers require long lengths for good performance, and tend to be very sensitive to oncoming flow variations. Such long, flow sensitive diffusers are not practical in wind turbine installations. Short diffusers stall, and just do not work in real applications. Also, the downstream diffusion needed may not be possible with the turbine energy extraction desired at the accelerated velocities. These effects have doomed all previous attempts at more efficient wind turbines using gas turbine technology.

Accordingly, it is a primary object of the present invention to provide an axial flow wind turbine that employs advanced fluid dynamic mixer/ejector pump principles to consistently deliver levels of power well above the Betz limit.

It is another primary object to provide an improved axial flow wind turbine that employs unique flow mixing (for wind turbines) and control devices to increase productivity of and minimize the impact of its attendant flow field on the surrounding environment located in its near vicinity, such as found in wind farms.

It is another primary object to provide an improved axial flow wind turbine that pumps in more flow through the rotor and then rapidly mixes the low energy turbine exit flow with high energy bypass wind flow before exiting the system.

It is a more specific object, commensurate with the above-listed objects, which is relatively quiet and safer to use in populated areas.

SUMMARY OF INVENTION

A mixer/ejector wind turbine system (nicknamed the "MEWT") for generating power is disclosed that combines fluid dynamic ejector concepts, advanced flow mixing and control devices, and an adjustable power turbine.

In the preferred embodiment, the MEWT is an axial flow turbine comprising, in order going downstream: an aerodynamically contoured turbine shroud having an inlet; a ring of stators within the shroud; an impeller having a ring of impeller blades "in line" with the stators; a mixer, attached to the turbine shroud, having a ring of mixing lobes extending downstream beyond the impeller blades; and an ejector comprising the ring of mixing lobes (e.g., like that shown in U.S. Pat. No. 5,761,900) and a mixing shroud extending downstream beyond the mixing lobes. The turbine shroud, mixer and ejector are designed and arranged to draw the maximum amount of fluid through the turbine and to minimize impact to the environment (e.g., noise) and other power turbines in its wake (e.g., structural or productivity losses). Unlike the prior art, the preferred MEWT contains a shroud with advanced flow mixing and control devices such as lobed or slotted mixers and/or one or more ejector pumps. The mixer/ejector pump presented is much different than used in the aircraft industry since the high energy air flows into the ejector inlets, and outwardly surrounds, pumps and mixes with the low energy air exiting the turbine shroud.

In this first preferred embodiment, the MEWT comprises: an axial flow wind turbine surrounded by an aerodynamically contoured turbine shroud incorporating mixing devices in its terminus region (i.e., an end portion of the turbine shroud) and a separate ejector duct overlapping but aft of said turbine shroud, which itself may incorporate advanced mixing devices in its terminus region.

In an alternate embodiment, the MEWT comprises: an axial flow wind turbine surrounded by an aerodynamically contoured turbine shroud incorporating mixing devices in its terminus region.

First-principles-based theoretical analysis of the preferred MEWT indicates that the MEWT can produce three or more time the power of its un-shrouded counterparts for the same frontal area, and increase the productivity of wind farms by a factor of two or more.

Applicants believe, based upon their theoretical analysis, that the preferred MEWT embodiment will generate three times the existing power of the same size conventional wind turbine.

Other objects and advantages of the current invention will become more readily apparent when the following written description is read in conjunction with the accompanying drawings.

DETAILED DESCRIPTION OF PREFERRED EMBODIMENTS

Figure 1:
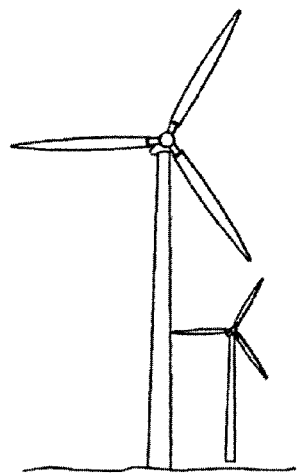
FIGS. 1, 27, 28, and 29, labeled "Prior Art", illustrate examples of prior turbines.
Figure 27:
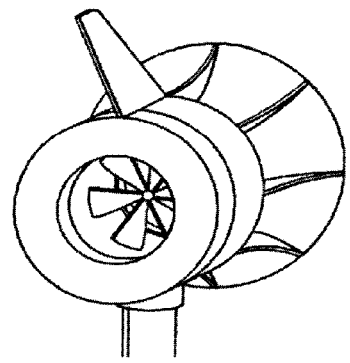
Figure 28:
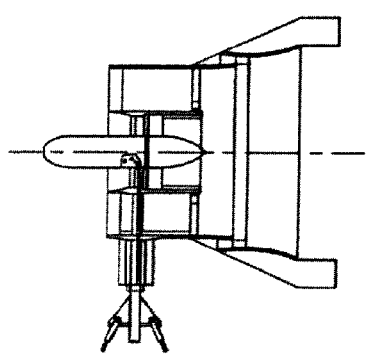
Figure 29:
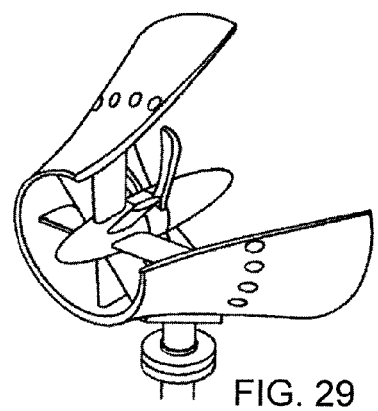
Figure 2:
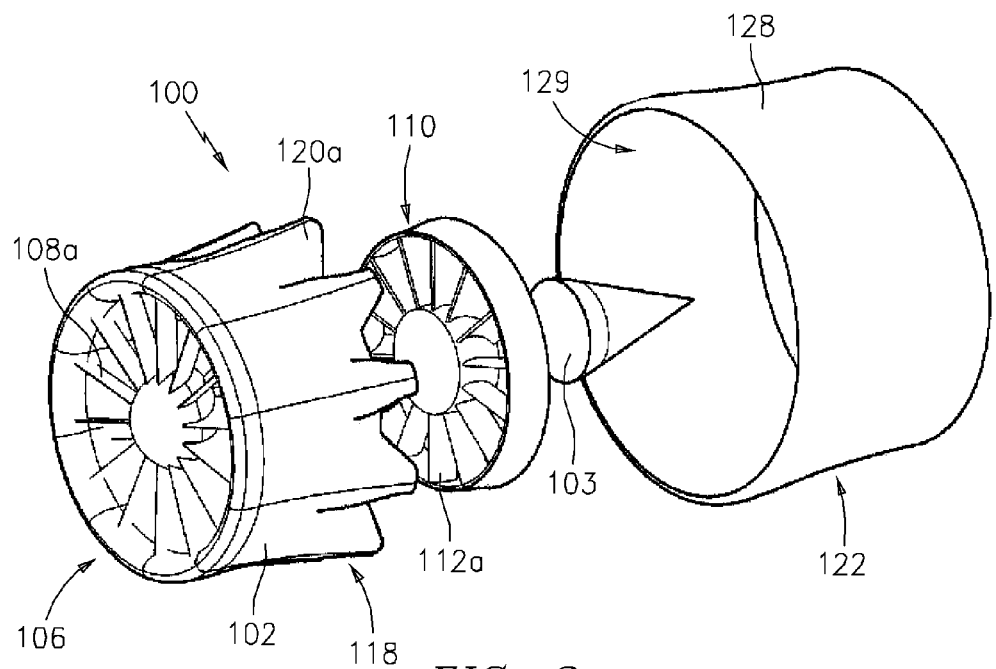
FIG. 2 is an exploded view of Applicants' preferred MEWT embodiment, constructed in accordance with the present invention.
Figure 3:
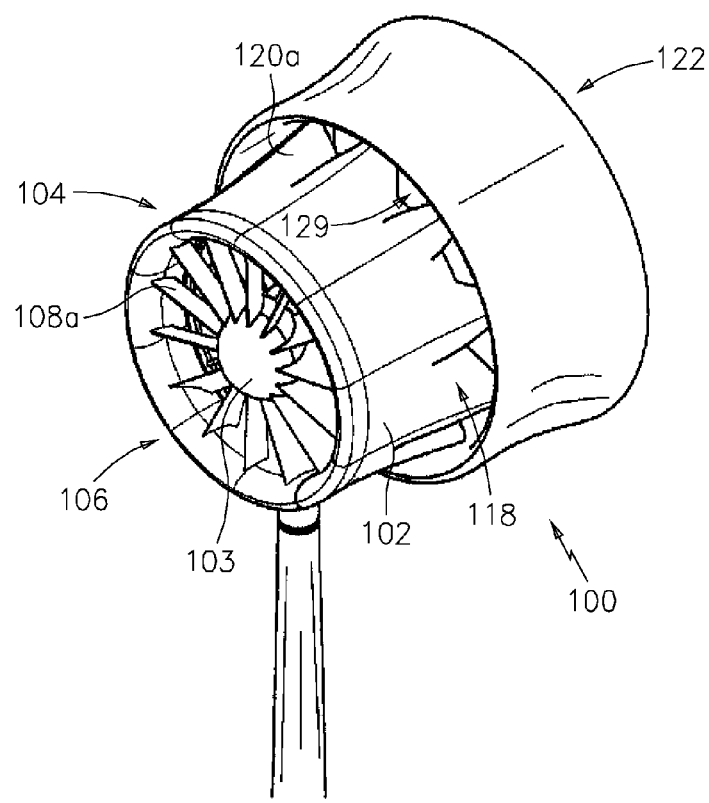
FIG. 3 is a front perspective view of the preferred MEWT attached to a support tower.
Figure 4:
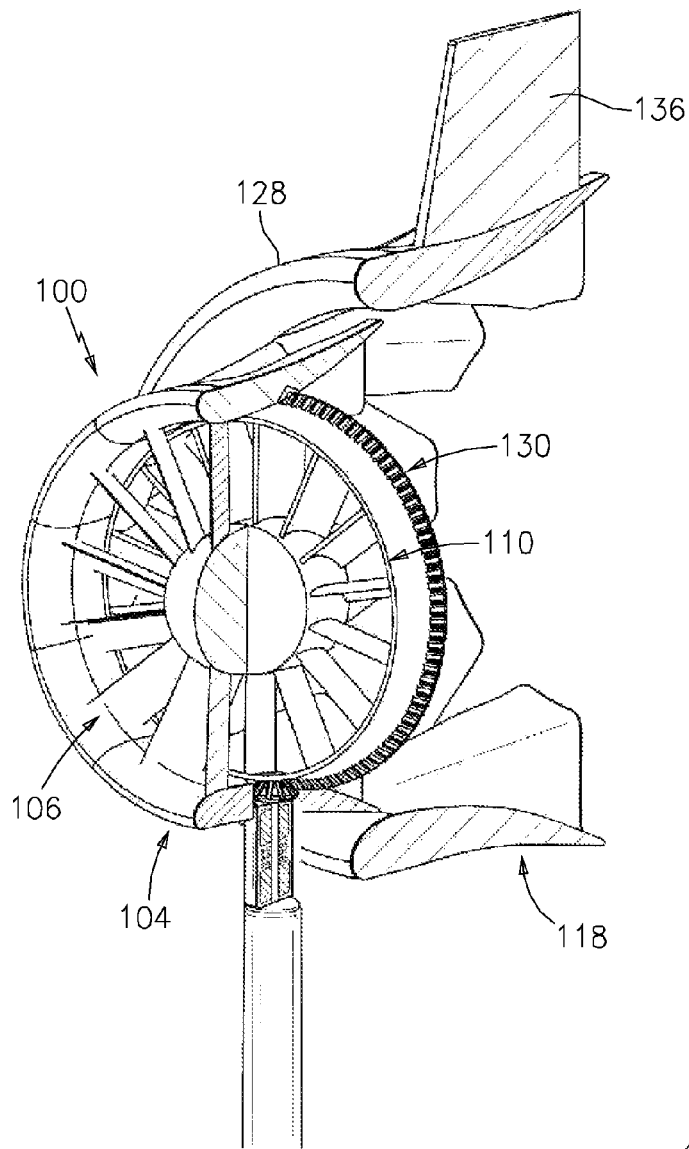
FIG. 4 is a front perspective view of a preferred MEWT with portions broken away to show interior structure, such as a power takeoff in the form of a wheel-like structure attached to the impeller.
Figure 5:
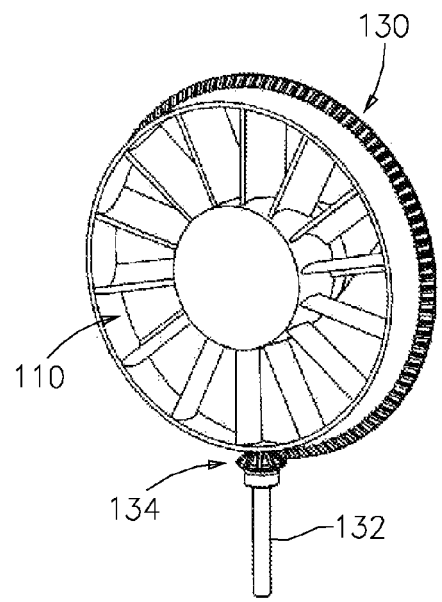
FIG. 5 is a front perspective view of just the stator, impeller, power takeoff, and support shaft from FIG. 4.

Referring to the drawings in detail, FIGS. 2-25 show alternate embodiments of Applicants' axial flow Wind Turbine with Mixers and Ejectors ("MEWT").

In the preferred embodiment (see FIGS. 2, 3, 4, 5), the MEWT 100 is an axial flow wind turbine comprising:
(a) an aerodynamically contoured turbine shroud 102;
(b) an aerodynamically contoured center body 103 within and attached to the turbine shroud 102;
(b) a turbine stage 104, surrounding the center body 103, comprising a stator ring 106 of stator vanes (e.g., 108a) and an impeller or rotor 110 having impeller or rotor blades (e.g., 112a) downstream and "in-line" with the stator vanes (i.e., leading edges of the impeller blades are substantially aligned with trailing edges of the stator vanes), in which:
  (i) the stator vanes (e.g., 108a) are mounted on the center body 103;
  (iii) the impeller blades (e.g., 112a) are attached and held together by inner and outer rings or hoops mounted on the center body 103;
(c) a mixer 118 having a ring of mixer lobes (e.g., 120a) on a terminus region (i.e., end portion) of the turbine shroud 102, wherein the mixer lobes (e.g., 120a) extend downstream beyond the impeller blades (e.g., 12a); and
(d) an ejector 122 comprising a shroud 128, surrounding the ring of mixer lobes (e.g., 120a) on the turbine shroud, with a profile similar to the ejector lobes shown in U.S.

Pat. No. 5,761,900, wherein the mixer lobes (e.g., 120*a*) extend downstream and into an inlet 129 of the ejector shroud 128.

Figure 7:
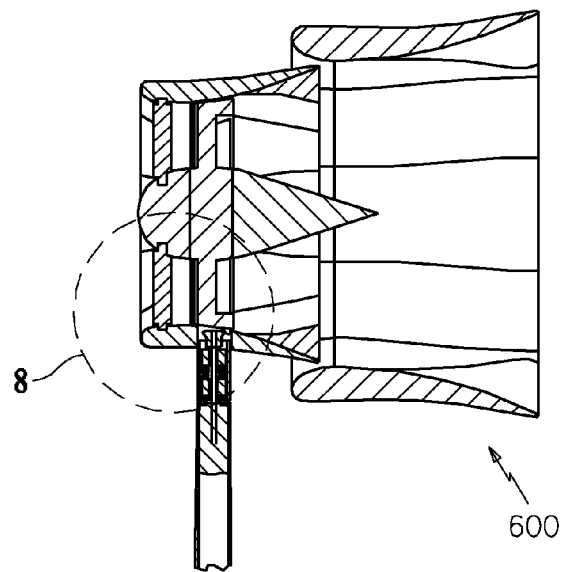
FIG. 7 is a side cross-sectional view of the MEWT of FIG. 6.

The center body 103 MEWT 100, as shown in FIG. 7, is preferably connected to the turbine shroud 102 through the stator ring 106 (or other means) to eliminate the damaging, annoying and long distance propagating low-frequency sound produced by traditional wind turbines as the turbine's blade wakes strike the support tower. The aerodynamic profiles of the turbine shroud 102 and ejector shroud 128 preferably are aerodynamically cambered to increase flow through the turbine rotor.

Applicants have calculated, for optimum efficiency in the preferred embodiment 100, the area ratio of the ejector pump 122, as defined by the ejector shroud 128 exit area over the turbine shroud 102 exit area will be between 1.5 and 3.0. The number of mixer lobes (e.g., 120*a*) would be between 6 and 14. Each lobe will have inner and outer trailing edge angles between 5 and 25 degrees. The primary lobe exit location will be at, or near, the entrance location or inlet 129 of the ejector shroud 128. The height-to-width ratio of the lobe channels will be between 0.5 and 4.5. The mixer penetration will be between 50% and 80%. The center body 103 plug trailing edge angles will be thirty degrees or less. The length to diameter (L/D) of the overall MEWT 100 will be between 0.5 and 1.25.

First-principles-based theoretical analysis of the preferred MEWT 100, performed by Applicants, indicate: the MEWT can produce three or more time the power of its un-shrouded counterparts for the same frontal area; and the MEWT can increase the productivity of wind farms by a factor of two or more. See Applicants' AIAA Technical Note, identified in the Background above, for the methodology and formulae used in their theoretical analysis.

Based on their theoretical analysis, Applicants believe their preferred MEWT embodiment 100 will generate three times the existing power of the same size conventional wind turbine (shown in FIG. 1).

In simplistic terms, the preferred embodiment 100 of the MEWT comprises: an axial flow turbine (e.g., stator vanes and impeller blades) surrounded by an aerodynamically contoured turbine shroud 102 incorporating mixing devices in its terminus region (i.e., end portion); and a separate ejector shroud (e.g., 128) overlapping, but aft, of turbine shroud 102, which itself may incorporate advanced mixing devices (e.g., mixer lobes) in its terminus region. Applicants' ring 118 of mixer lobes (e.g., 120*a*) combined with the ejector shroud 128 can be thought of as a mixer/ejector pump. This mixer/ejector pump provides the means for consistently exceeding the Betz limit for operational efficiency of the wind turbine.

Applicants have also presented supplemental information for the preferred embodiment 100 of MEWT shown in FIGS. 2A, 2B. It comprises a turbine stage 104 (i.e., with a stator ring 106 and an impeller 110) mounted on center body 103, surrounded by turbine shroud 102 with embedded mixer lobes (e.g., 120*a*) having trailing edges inserted slightly in the entrance plane of ejector shroud 128. The turbine stage 104 and ejector shroud 128 are structurally connected to the turbine shroud 102, which itself is the principal load carrying member.

The length of the turbine shroud 102 is equal or less than the turbine shroud's outer maximum diameter. The length of the ejector shroud 128 is equal or less than the ejector shroud's outer maximum diameter. The exterior surface of the center body 103 is aerodynamically contoured to minimize the effects of flow separation downstream of the MEWT 100. It may be longer or shorter than the turbine shroud 102 or the ejector shroud 128, or their combined lengths.

The turbine shroud's entrance area and exit area will be equal to or greater than that of the annulus occupied by the turbine stage 104, but need not be circular in shape so as to allow better control of the flow source and impact of its wake. The internal flow path cross-sectional area formed by the annulus between the center body 103 and the interior surface of the turbine shroud 102 is aerodynamically shaped to have a minimum area at the plane of the turbine and to otherwise vary smoothly from their respective entrance planes to their exit planes. The turbine and ejector shrouds' external surfaces are aerodynamically shaped to assist guiding the flow into the turbine shroud inlet, eliminating flow separation from their surfaces, and delivering smooth flow into the ejector entrance 129. The ejector 128 entrance area, which may be noncircular in shape (see, e.g., FIG. 25), is larger than the mixer 118 exit plane area and the ejector's exit area may also be noncircular in shape.

Optional features of the preferred embodiment 100 can include: a power take-off 130 (see FIGS. 4 and 5), in the form of a wheel-like structure, which is mechanically linked at an outer rim of the impeller 110 to a power generator (not shown); a vertical support shaft 132 with a rotatable coupling at 134 (see FIG. 5), for rotatably supporting the MEWT 100, which is located forward of the center-of-pressure location on the MEWT for self-aligning the MEWT; and a self-moving vertical stabilizer or "wing-tab" 136 (see FIG. 4), affixed to upper and lower surfaces of ejector shroud 128, to stabilize alignment directions with different wind streams.

MEWT 100, when used near residences can have sound absorbing material 138 affixed to the inner surface of its shrouds 102, 128 (see FIG. 24) to absorb and thus eliminate the relatively high frequency sound waves produced by the interaction of the stator 106 wakes with the impeller 110. The MEWT can also contain safety blade containment structure (not shown)

Figure 14:
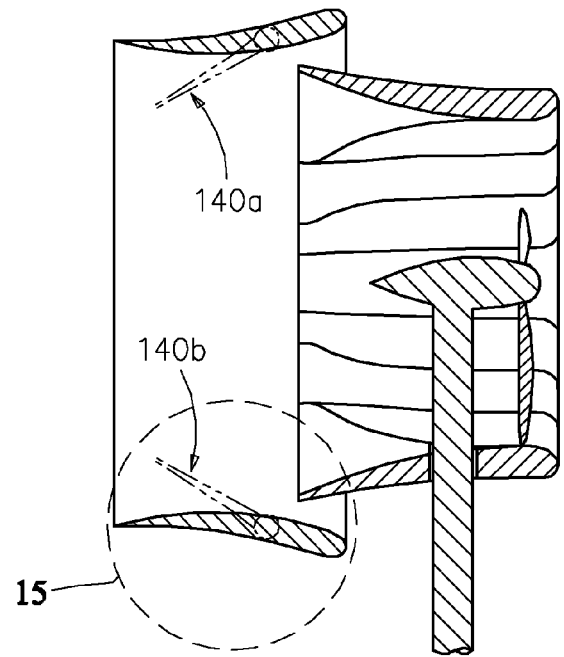
FIG. 14 is a side cross-sectional view, taken along sight line 14-14 of FIG. 13, showing two pivotable blockers for flow control.
Figure 15:
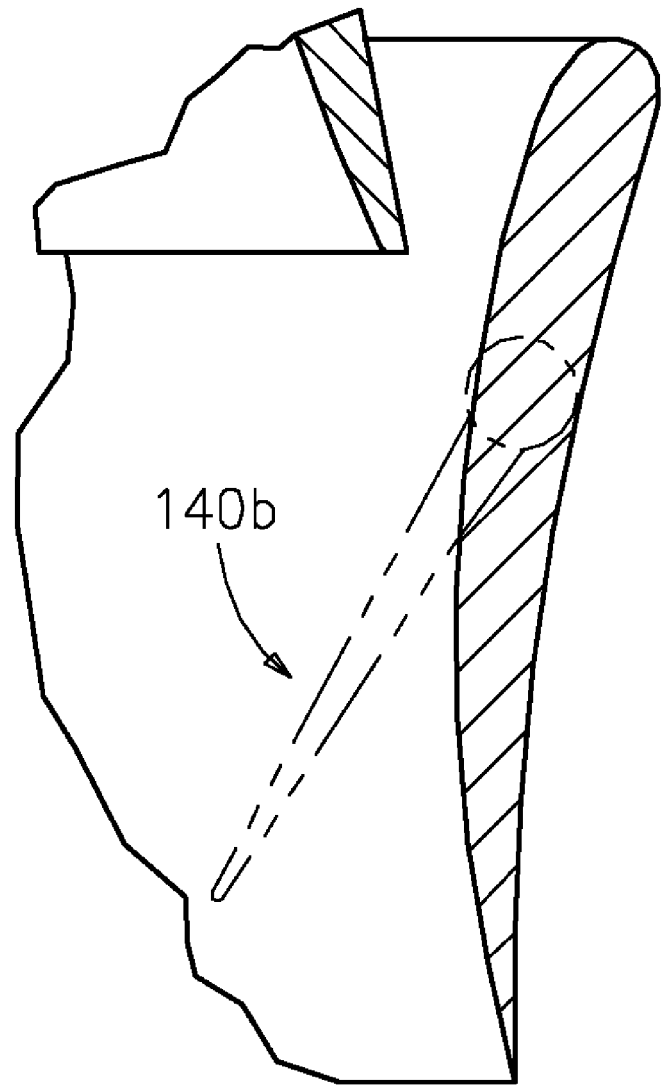
FIG. 15 is a close-up of an encircled blocker in FIG. 14.
Figure 16:
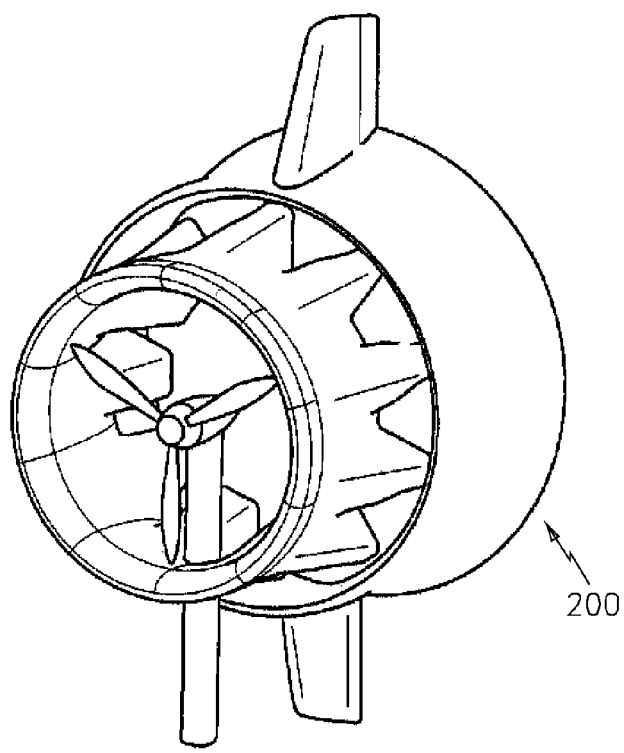
FIG. 16 illustrates an alternate embodiment of an MEWT with two optional pivoting wing-tabs for wind alignment.
Figure 17:
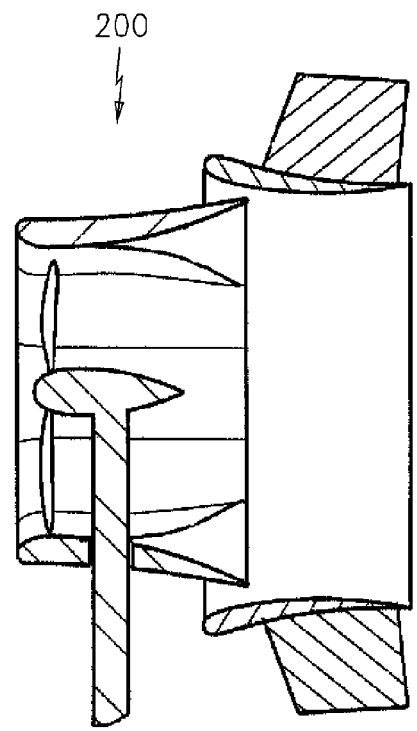
FIG. 17 is a side cross-sectional view of the MEWT of FIG. 16.
Figure 18:
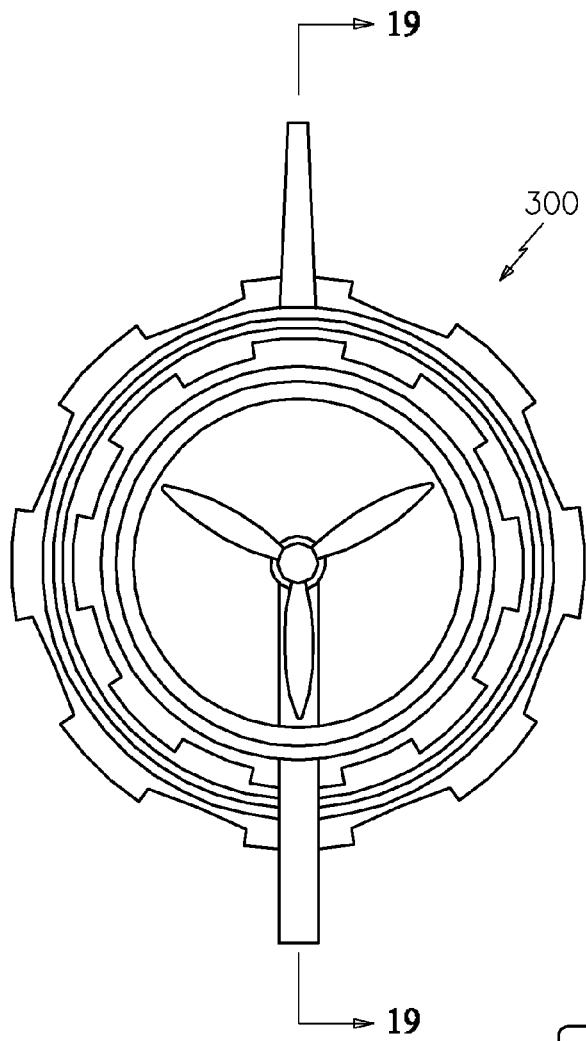
FIG. 18 is a front plan view of an alternate embodiment of the MEWT incorporating a two-stage ejector with mixing devices (here, a ring of slots) in the terminus regions of the turbine shroud (here, mixing lobes) and the ejector shroud.
Figure 19:
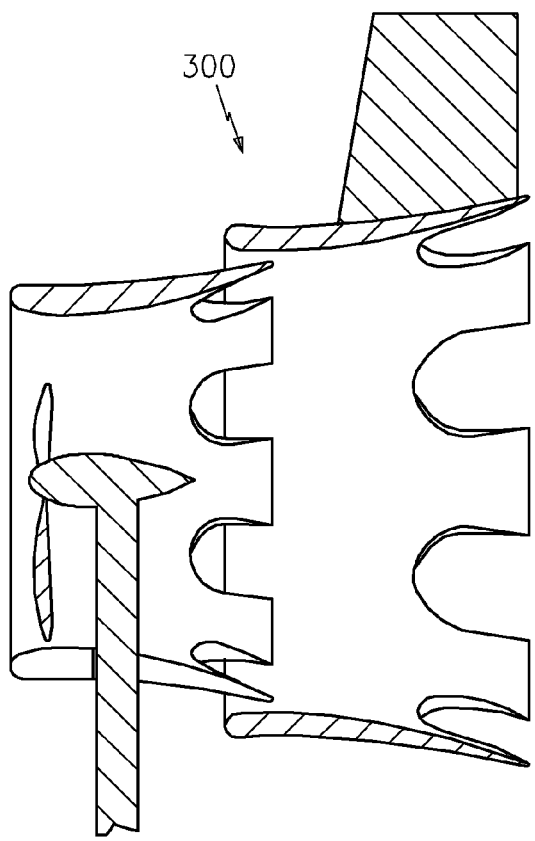
FIG. 19 is a side cross-sectional view of the MEWT of FIG. 18.
Figure 20:
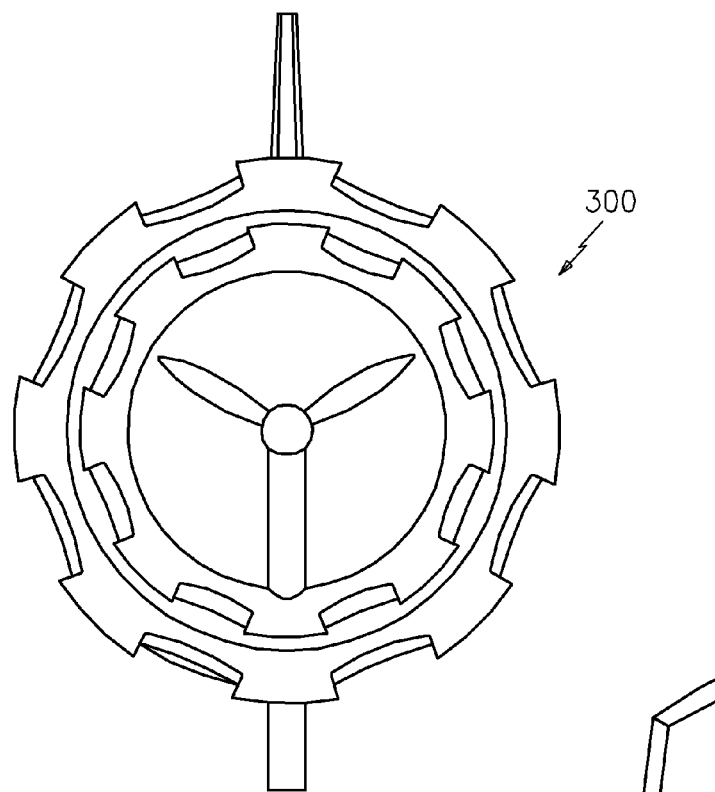
FIG. 20 is a rear view of the MEWT of FIG. 18.
Figure 21:
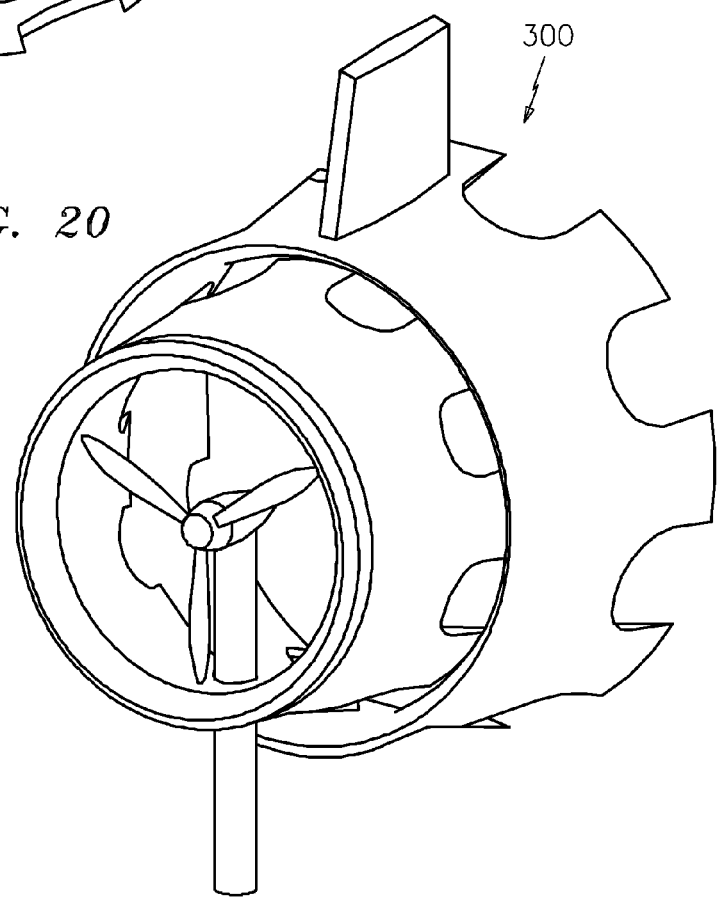
FIG. 21 is a front perspective view of the MEWT of FIG. 18.
Figure 22:
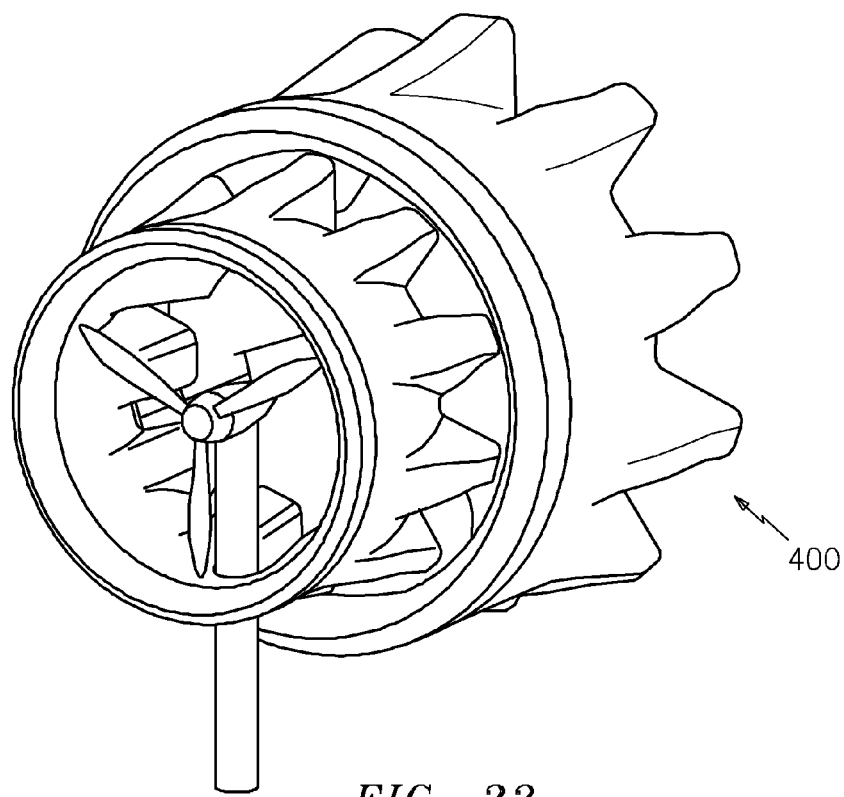
FIG. 22 is a front perspective view of an alternate embodiment of the MEWT incorporating a two-stage ejector with mixing lobes in the terminus regions of the turbine shroud and the ejector shroud.
Figure 23:
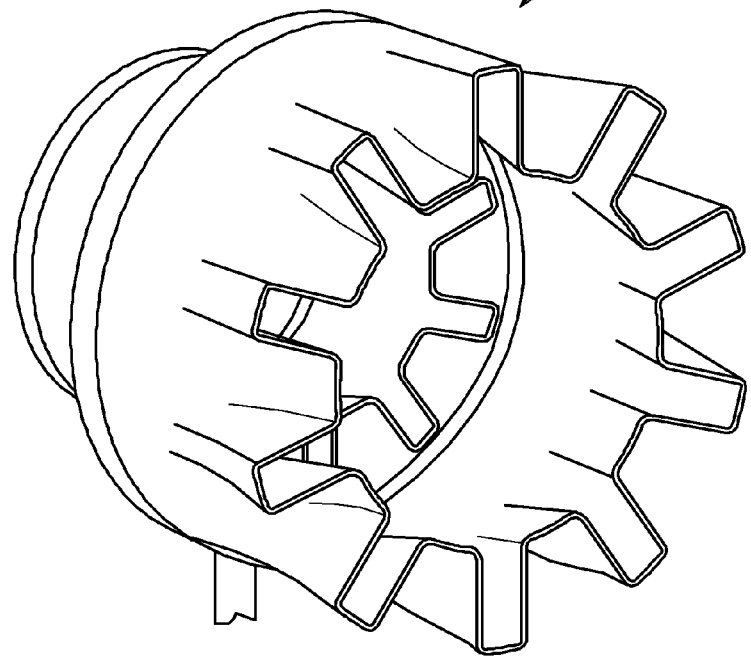
FIG. 23 is a rear perspective view of the MEWT of FIG. 22.
Figure 24:
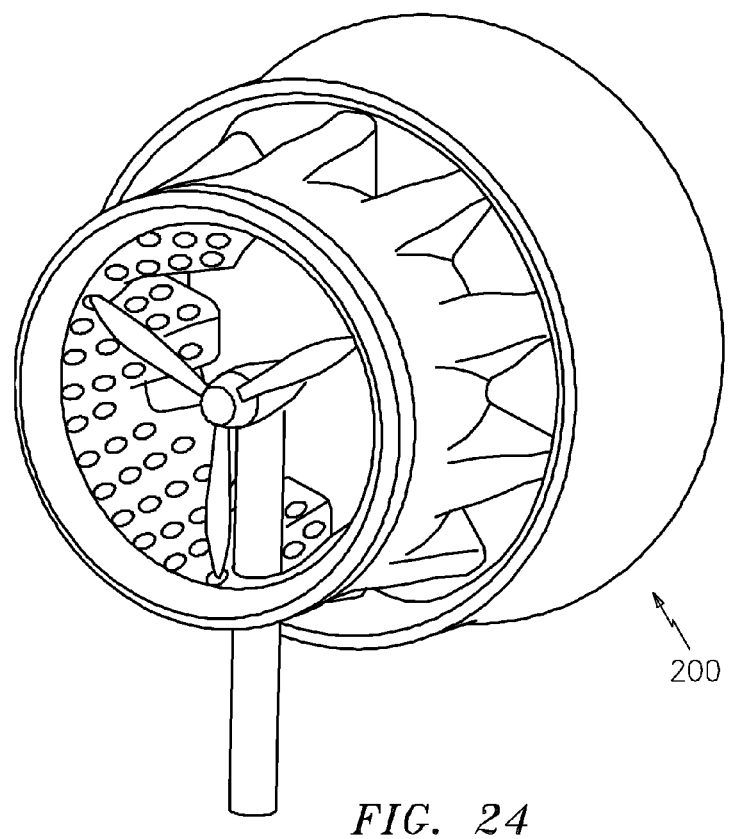
FIG. 24 shows optional acoustic lining within the turbine shroud of FIG. 22.
Figure 25:
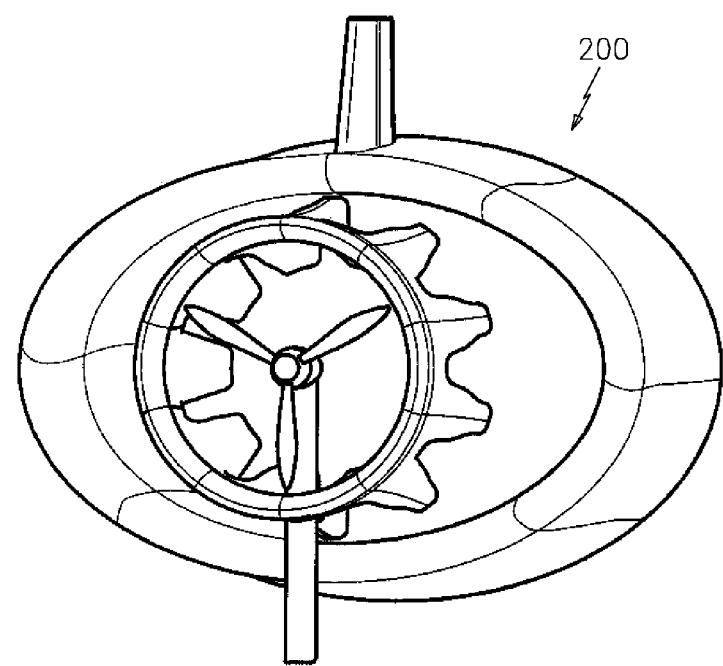
FIG. 25 shows a MEWT with a noncircular shroud component.
Figure 26:
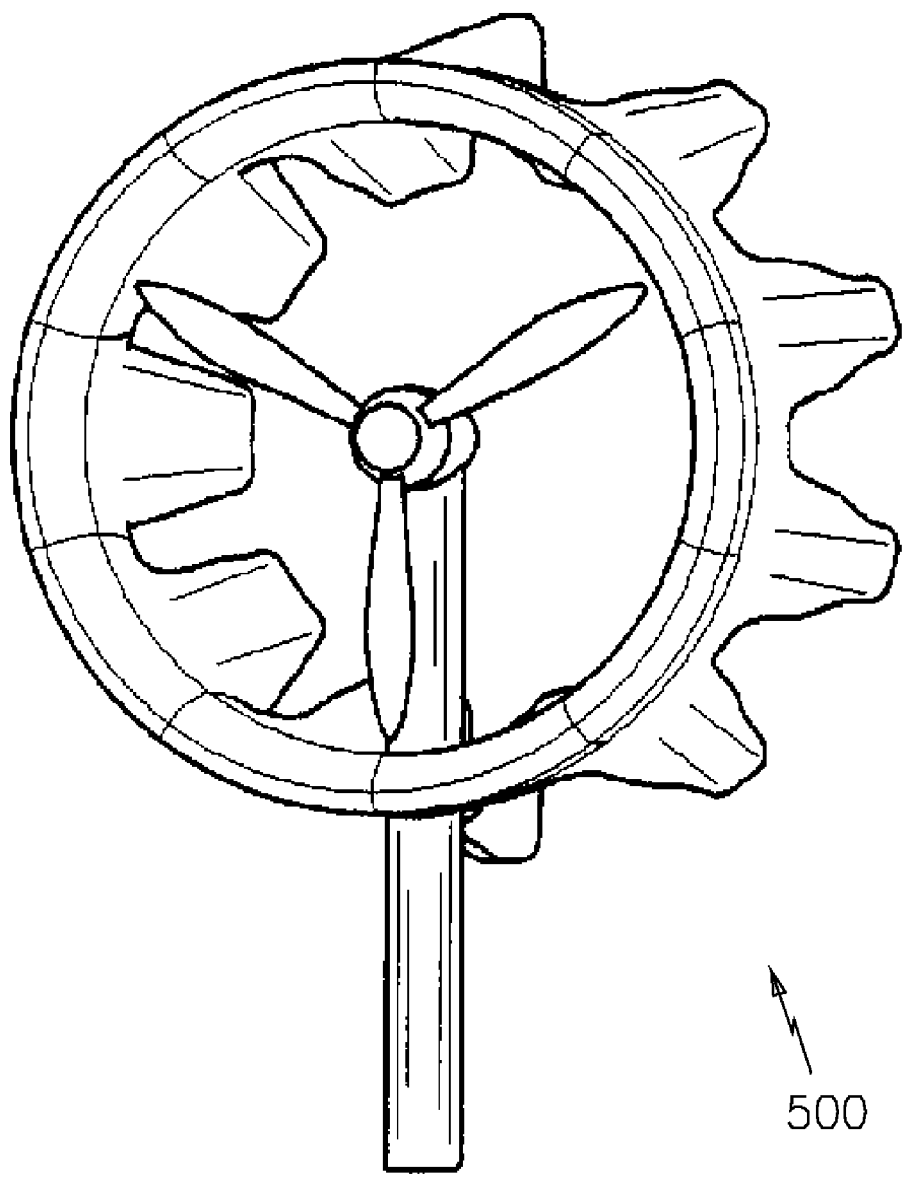
FIG. 26 shows an alternate embodiment of the preferred MEWT with mixer lobes on the terminus region (i.e., an end portion) of the turbine shroud.

FIGS. 14, 15 show optional flow blockage doors 140*a*, 140*b*. They can be rotated via linkage (not shown) into the flow stream to reduce or stop flow through the turbine 100 when damage, to the generator or other components, due to high flow velocity is possible.

Figure 8:
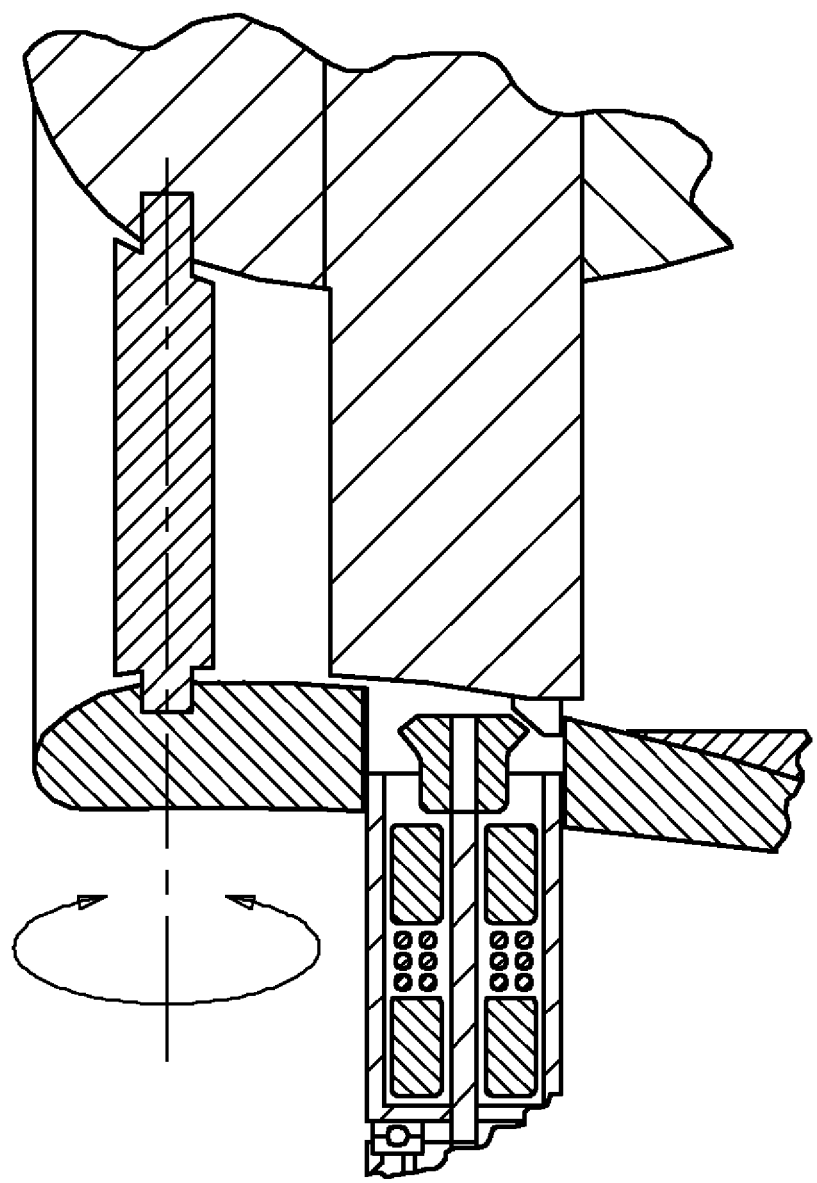
FIG. 8 is a close-up of a rotatable coupling (encircled in FIG. 7), for rotatably attaching the MEWT to a support tower, and a mechanical rotatable stator blade variation.
Figure 9:
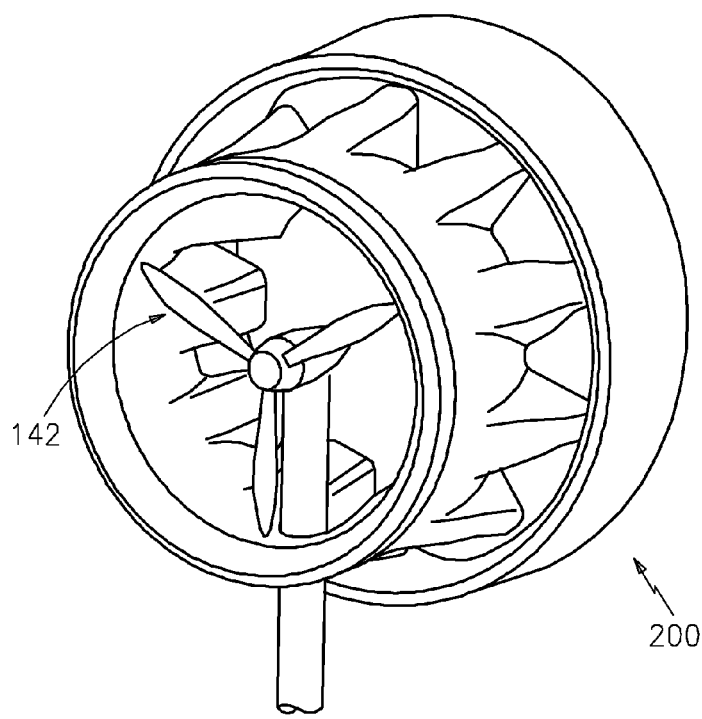
FIG. 9 is a front perspective view of an MEWT with a propeller-like rotor.
Figure 10:
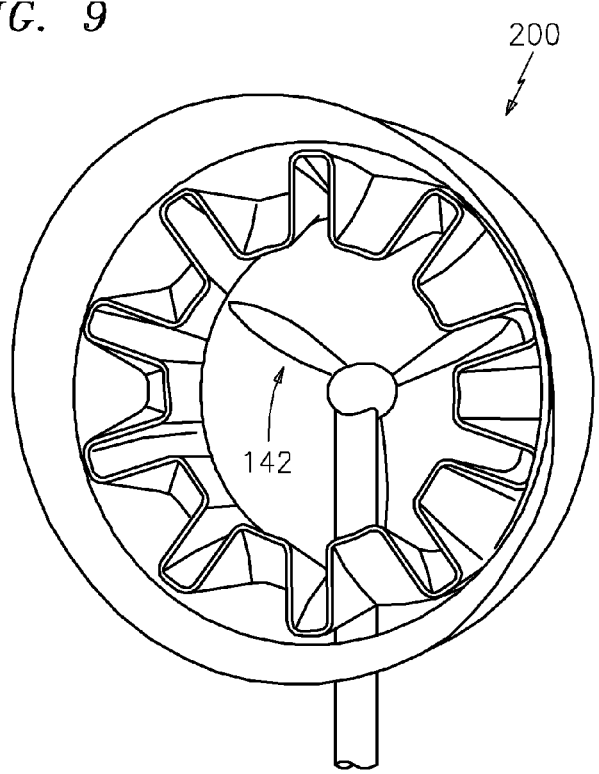
FIG. 10 is a rear perspective view of the MEWT of FIG. 9.
Figure 11:
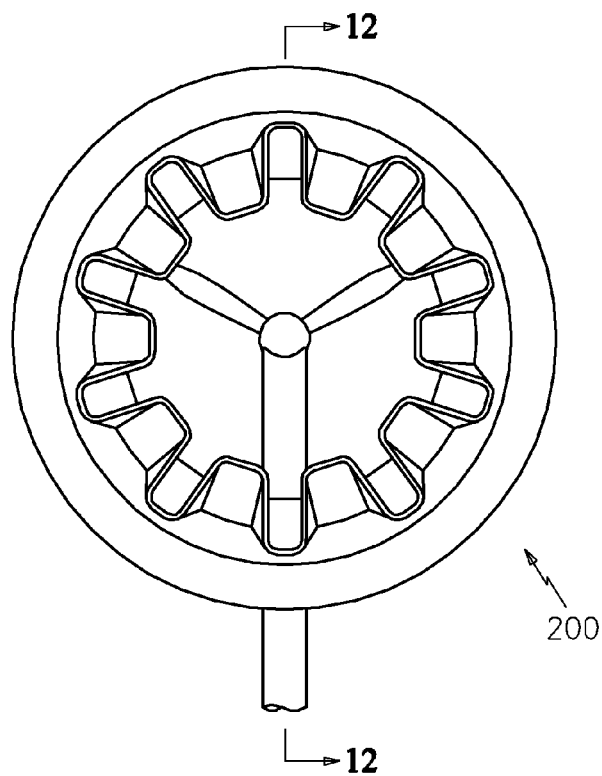
FIG. 11 shows a rear plan view of the MEWT of FIG. 9.
Figure 12:
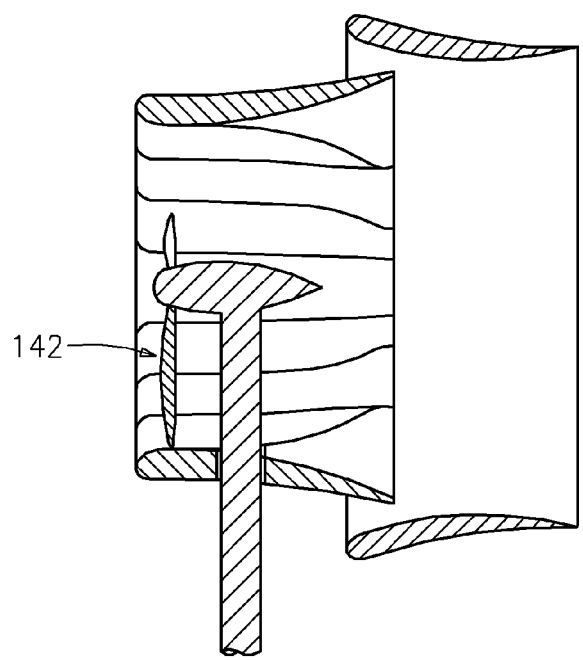
FIG. 12 is a cross-sectional view taken along sight line 12-12 of FIG. 11.
Figure 13:
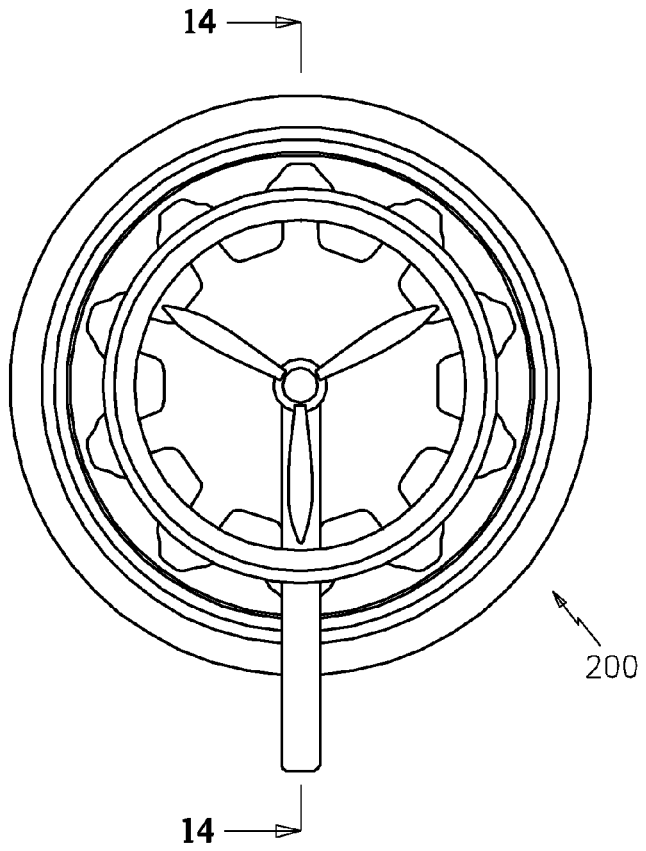
FIG. 13 is a front plan view of the MEWT of FIG. 9.

FIG. 8 presents another optional variation of Applicants' preferred MEWT 100. The stator vanes' exit-angle incidence is mechanically varied in situ (i.e., the vanes are pivoted) to accommodate variations in the fluid stream velocity so as to assure minimum residual swirl in the flow exiting the rotor.

Note that Applicants' alternate MEWT embodiments, shown in FIGS. 9-23 and 26, each use a propeller-like rotor (e.g., 142 in FIG. 9) rather than a turbine rotor with a ring of impeller blades. While perhaps not as efficient, these embodiments may be more acceptable to the public.

Applicants' alternate MEWT embodiments are variations 200, 300, 400, 500 containing zero (see, e.g., FIG. 26), one- and two-stage ejectors with mixers embedded in the terminus regions (i.e., end portions) of the ejector shrouds, if any. See, e.g., FIGS. 18, 20, and 22 for mixers embedded in the terminus regions of the ejector shrouds. Analysis indicates such MEWT embodiments will more quickly eliminate the inherent velocity defect occurring in the wake of existing wind turbines and thus reduce the separation distance required in a wind farm to avoid structural damage and/or loss of productivity.

Figure 6:
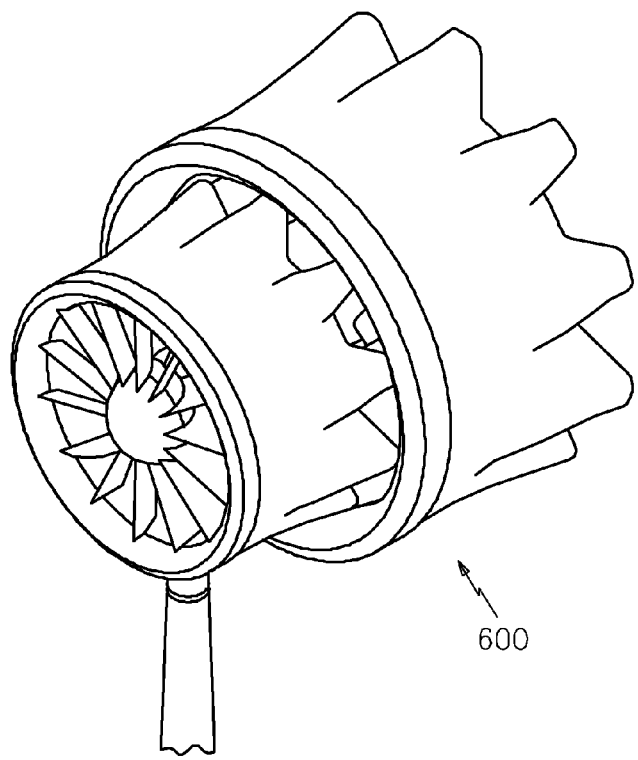
FIG. 6 is an alternate embodiment of the preferred MEWT with a mixer/ejector pump having mixer lobes on the terminus regions (i.e., an end portion) of the ejector shroud.

FIG. 6 shows a "two-stage" ejector variation 600 of the pictured embodiment 100 having a mixer at the terminus region of the ejector shroud.

It should be understood by those skilled in the art that obvious structural modifications can be made without departing from the spirit or scope of the invention. For example, slots could be used instead of the mixer lobes or the ejector lobes. In addition, no blocker arm is needed to meet or exceed the Betz limit. Accordingly, reference should be made primarily to the appended claims rather than the foregoing description.

We claim:

1. An axial flow wind turbine comprising:
   an aerodynamically contoured turbine shroud with an inlet, an outlet, and a ring of mixer lobes arranged along a trailing edge;
   a turbine stage comprising a single stator ring and a single ring of rotor blades downstream of the single stator ring, the turbine stage being mounted within the turbine shroud, and the mixer lobes of the turbine shroud being downstream of the turbine stage; and
   an ejector shroud having an inlet and an outlet, the ejector shroud being located downstream of the turbine shroud and surrounding the trailing edge of the turbine shroud;
   the turbine shroud, turbine stage, and ejector shroud being configured for exposure to ambient wind flow.

2. An axial flow wind turbine, comprising:
   a turbine shroud having an inlet for receiving a high energy primary air stream, an outlet, and a ring, of mixer lobes arranged along trailing edge that defines the outlet;
   a turbine stage positioned within the turbine shroud for extracting energy from the high energy primary air stream as it flows through the turbine stage to produce a low energy turbine exit flow stream, the turbine stage comprising a single stator ring and a single ring of rotor blades downstream of the single stator ring, and the mixer lobes of the turbine shroud being downstream of the turbine stage; and
   an ejector shroud having an inlet for receiving the turbine shroud and an outlet, the ejector shroud being located downstream of the turbine shroud;
   wherein the mixer lobes of the turbine shroud produce increased air flow mixing and extend into the inlet of the ejector shroud, and wherein the inlet of the ejector shroud is also adapted to receive a secondary high energy bypass air stream which has not passed through the turbine shroud which is mixed with the low energy turbine exit flow stream by the mixer lobes thereby increasing the draw flow volume of the primary high energy air stream through the turbine stage.

3. The axial flow wind turbine of claim 2, wherein the ejector shroud outlet has a cross-sectional area greater than a cross-sectional area of the ejector shroud inlet.

4. The axial flow wind turbine of claim 2, wherein the ejector shroud inlet has a cross-sectional area greater than a cross-sectional area of the ejector shroud outlet.

5. The axial flow wind turbine of claim 2, wherein the inlet of the turbine shroud has a circular cross-section.

6. The axial flow wind turbine of claim 2, wherein the inlet of he turbine shroud has a non-circular cross-section.

7. The axial flow wind turbine of claim 2, wherein the turbine shroud is aerodynamically cambered to increase the speed of the high energy primary air stream.

8. The axial flow wind turbine of claim 2, wherein the ejector shroud inlet has a circular cross-section.

9. The axial flow wind turbine of claim 2, wherein the ejector shroud inlet has a non-circular cross-section.

10. The axial flow wind turbine of claim 2, wherein the turbine shroud outlet has a cross-sectional area greater than a cross-sectional area of the turbine shroud inlet.

11. The axial flow wind turbine of claim 2, wherein the turbine shroud outlet has a cross-sectional area less than a cross-sectional area of the turbine shroud inlet.

12. The axial flow wind turbine of claim 2, further comprising a swivel joint on a lower outer surface of the turbine shroud for mounting the turbine on a support structure.

13. The axial flow wind turbine of claim 2, further comprising at least one stabilizer vane mounted on an exterior of the ejector shroud for aligning the turbine shroud inlet into an air stream.

14. The axial flow wind turbine of claim 2, wherein the ejector shroud further comprises mixer lobes spacedly arranged around the ejector shroud outlet so that a trailing edge of the ejector shroud has a circular crenellated shape.

15. The axial flow wind turbine of claim 2, wherein the cross-sectional area ratio of the ejector shroud outlet and the turbine shroud outlet is between 1.5 and 3.0.

16. The axial flow wind turbine of claim 2, wherein the turbine shroud has between 6 and 14 mixer lobes.

17. The axial flow wind turbine of claim 2, wherein each mixer lobe has inner and outer trailing edge angles of between 5 and 25 degrees.

18. The axial flow wind turbine of claim 2, wherein the height-to-width ratio of the lobe channels of the mixer lobes is between 0.5 and 4.5.

19. The axial flow wind turbine of claim 2, wherein the mixer lobes of the turbine shroud penetrate the ejector shroud between 50% and 80%.

20. The axial flow wind turbine of claim 2, wherein the length to distance (L/D) of the turbine is between 0.5 and 1.25.

* * * * *